US010643222B2

(12) United States Patent
Cristofaro

(10) Patent No.: US 10,643,222 B2
(45) Date of Patent: May 5, 2020

(54) SELECTING ANONYMOUS USERS BASED ON USER LOCATION HISTORY

(71) Applicant: David Cristofaro, Aliso Viejo, CA (US)

(72) Inventor: David Cristofaro, Aliso Viejo, CA (US)

( * ) Notice: Subject to any disclaimer, the term of this patent is extended or adjusted under 35 U.S.C. 154(b) by 0 days.

(21) Appl. No.: 13/629,353

(22) Filed: Sep. 27, 2012

(65) Prior Publication Data

US 2014/0089049 A1    Mar. 27, 2014

(51) Int. Cl.
*G06Q 10/00* (2012.01)
*G06Q 30/02* (2012.01)
*H04W 12/02* (2009.01)
*H04W 4/029* (2018.01)
*H04W 12/00* (2009.01)

(52) U.S. Cl.
CPC ..... *G06Q 30/0201* (2013.01); *G06Q 30/0203* (2013.01); *H04W 4/029* (2018.02); *H04W 12/02* (2013.01); *H04W 12/00503* (2019.01)

(58) Field of Classification Search
USPC .............................................. 705/7.11–7.42
See application file for complete search history.

(56) References Cited

U.S. PATENT DOCUMENTS

2001/0036224 A1    11/2001    Demello et al.
2006/0111961 A1    5/2006    McQuivey
(Continued)

FOREIGN PATENT DOCUMENTS

WO    2007143106 A2    12/2007

OTHER PUBLICATIONS

Memon et al., Enhanced Privacy and Authentication: An Efficient and Secure Anonymous Communication for Location Based Service Using Asymmetric Cryptography Scheme, May 2015, Springer (Year: 2015).*

(Continued)

*Primary Examiner* — Brian M Epstein
*Assistant Examiner* — Allison M Robinson
(74) *Attorney, Agent, or Firm* — Pillsbury Winthrop Shaw Pittman, LLP

(57) ABSTRACT

Provided is a process for selecting candidates for participating in a market-research survey, or receiving other offers, based on location history while protecting privacy of the candidates. In some cases, the process includes: obtaining, at a survey-participant identification system, location histories from client devices, and the location histories indicating locations of the client device over time; associating each of the location histories with an anonymous pseudonym of the survey candidate; storing the location histories and the association with the anonymous pseudonyms in memory accessible to the server; obtaining, at the survey-participant identification system, criteria by which to select survey candidates, the criteria specifying locations relevant to a survey; selecting, with the survey-participant identification system, anonymous pseudonyms in memory that are associated with a location history that satisfies the criteria; and sending messages to the client devices inviting survey candidates corresponding to the selected anonymous pseudonyms to further identify themselves to participate in the survey.

27 Claims, 4 Drawing Sheets

(56) References Cited

U.S. PATENT DOCUMENTS

| | | | |
|---|---|---|---|
| 2006/0111962 A1 | 5/2006 | Holsinger | |
| 2006/0167747 A1 | 7/2006 | Goodman et al. | |
| 2007/0281689 A1 | 12/2007 | Altman et al. | |
| 2007/0282621 A1* | 12/2007 | Altman | G06Q 10/10 705/319 |
| 2008/0154895 A1 | 6/2008 | Carmony | |
| 2009/0089558 A1* | 4/2009 | Bradford | G05B 21/02 712/225 |
| 2009/0150217 A1* | 6/2009 | Luff | G06Q 30/02 705/7.32 |
| 2009/0327434 A1* | 12/2009 | Reynolds | G06Q 30/02 709/206 |
| 2011/0106587 A1 | 5/2011 | Lynch et al. | |
| 2011/0106721 A1 | 5/2011 | Nickerson et al. | |
| 2012/0022919 A1* | 1/2012 | Balinsky | G06Q 10/10 705/7.32 |
| 2012/0203663 A1* | 8/2012 | Sinclair | G06F 21/30 705/26.41 |

OTHER PUBLICATIONS

Lavin, Gregg, "Market Research Surveys on the Go," Digiday, Oct. 14, 2010, pp. 1-2, US.

Wikipedia, the free encyclopedia, "Mobile market research," en.wikipedia.org/wiki/Mobile_marketing_research, Jun. 13, 2012, pp. 1-4, US.

Quirk's Marketing Research Media, "Software Review: Survey Swipe," www.quirks.com/articles/2012/20120203.aspx, Jun. 12, 2012, pp. 1-7, US.

Polldaddy, "Create stunning online surveys," polldaddy.com/features, Jun. 12, 2012, pp. 1-2, US.

California Department of Transportation, "Mobile Survey," www.dot.ca.gov/hq/tsip/tab/gps_atd.html, Jun. 12, 2012, pp. 1-3, US.

MOBROG/get paid for surveys/online surveys/app for opinion polls, "Frequently Asked Questions," wambling/us/paid-online-surveys/faq.html, Jun. 12, 2012, pp. 1-3, US.

International Search Report and Written Opinion for Related PCT Application PCT/US2013/59188, dated Apr. 22, 2014, pp. 1-10.

International Preliminary Report on Patentability dated Jun. 9, 2015 for related PCT Application PCT/US2013/059188, pp. 1 to 6.

* cited by examiner

SELECTING ANONYMOUS USERS BASED ON USER LOCATION HISTORY

BACKGROUND OF THE INVENTION

1. Field of the Invention

The present invention relates generally to identifying users based on location and, more specifically, identifying users based on each user's location while protecting the user's privacy.

2. Description of the Related Art

Marketers and product developers rely on consumer surveys to measure performance of ads, products, and services. Often such surveyors wish to select survey participants based on where, geographically, the participants have been and what time they were there, e.g., drivers who passed a billboard during evening rush hour, or people exposed to pollen in some region and taking a particular allergy medication. Similarly, marketers often seek to present other offers, e.g., a discount, to users based on the user's location history. However, identifying candidates based on location is difficult, because for relatively strict criteria, only a small portion of the general population will meet the criteria, e.g., the set of above-mentioned drivers who also take a particular type of blood-pressure medication related to the an ad on billboard. Exacerbating the problem, many potential candidates are hesitant to reveal their location history for privacy reasons.

SUMMARY OF THE INVENTION

The following is a non-exhaustive listing of some aspects of the present techniques. These and other aspects are described in the following disclosure.

In some aspects, the present invention includes a process for selecting candidates for participating in a market-research survey, or receiving other offers like discounts, based on location history while protecting privacy of the candidates. In some cases, the process includes: obtaining, at a survey-participant (or offer-participant, more generally) identification system, location histories from client devices, each client device being carried by a survey candidate, and the location histories indicating locations of the client device over time; associating each of the location histories with an anonymous pseudonym of the survey candidate; storing the location histories and the association with the anonymous pseudonyms in memory accessible to the server; obtaining, at the survey-participant identification system, criteria by which to select survey candidates, the criteria specifying locations relevant to a survey; selecting, with the survey-participant identification system, anonymous pseudonyms in memory that are associated with a location history that satisfies the criteria; and sending messages to the client devices inviting survey candidates corresponding to the selected anonymous pseudonyms to further identify themselves to participate in the survey, or receive some other offer.

Some aspects include a system for selecting candidates for participating in a market-research survey, or receiving other offers, based on location history while protecting privacy of the candidates. The system in some cases includes one or more processors and memory in communication with the one or more processors, the memory storing instructions that when executed by the one or more processors cause the one or more processors to perform the above-mentioned process.

Some aspects include a tangible, machine-readable, non-transitory medium storing instructions that when executed cause a computing system to perform the above-mentioned process.

Some aspects include a tangible, non-transitory, machine-readable memory storing instructions, that when executed, cause a computing device to perform steps including: storing in memory of a hand-held computing device a location history of the computing device; receiving, at the hand-held computing device, from a remote server, location criteria specifying a geographic area related to a survey; ascertaining whether the location history in memory satisfies the location criteria; and after ascertaining that the location history satisfies the location criteria, displaying on the hand-held computing an indication that the user of the device has an option to answer questions related to the survey.

Some aspects include the process performed by the above-mentioned computing system, and other aspects include the computing system itself, having been programmed to perform the process.

Some aspects include each of the above-mentioned processes applied to the identification of candidates to receive an offer, such as an offer to participate in a survey or an offer to receive a discount, as well as systems for the same and memory storing instructions for the same.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
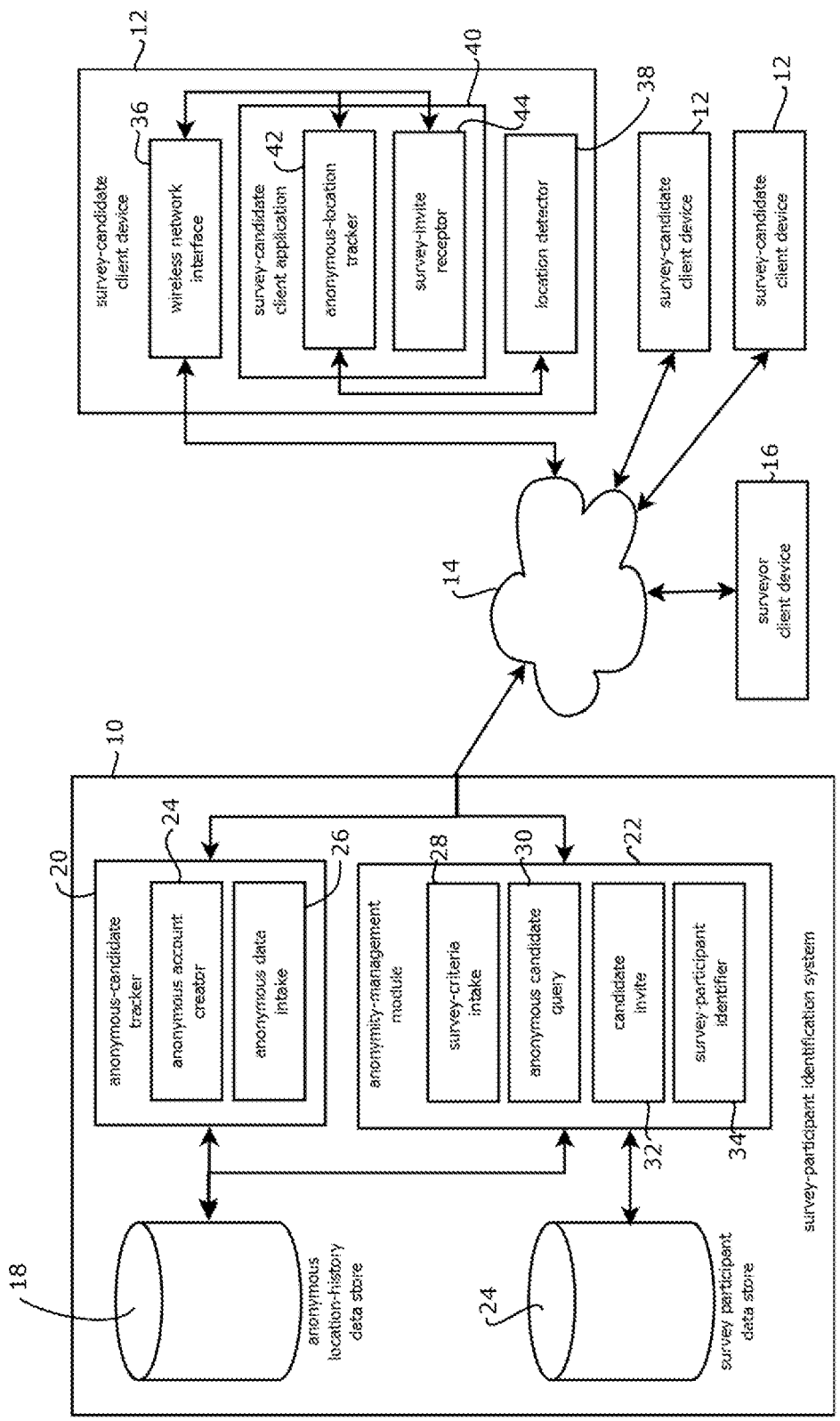
FIG. 1 illustrates an example of a system in accordance with certain embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

In some embodiments, location is tracked anonymously (i.e., preserving anonymity of the tracked party), and candidates who meet survey (or other offer) criteria are invited to reveal themselves, thereby preserving the candidate's privacy except when the candidate chooses to accept the offer and reveal themselves. An application on the candidate's smartphone tracks location, and this data is used to determine whether the otherwise anonymous person carrying the phone satisfies survey (or other offer) criteria, e.g., being in a particular zip code at a particular time. In some embodiments, the location history is sent to and stored by a server, which associates the location history with an anonymous pseudonym (e.g., a cryptographic hash value) for the candidate. The server identifies which anonymous pseudonyms are associated with location histories that satisfy survey criteria, and the people corresponding to those anonymous pseudonyms are invited to reveal themselves further, the invitation being communicated either by pushing a message to a smartphone address associated with the anonymous pseudonym, or waiting for a smartphone to pull such a message by requesting messages associated with the anonymous pseudonym. In other embodiments, the location history remains on the smartphone, and the server sends the survey criteria to the smartphone, which then ascertains whether the person carrying the phone satisfies the criteria and, if appropriate, invites the person to further reveal themselves, thereby further preserving privacy by keeping location history in client-side storage. In each case, the user has control over when the user's unique identity is revealed, which is expected to entice more users to participate, and facilitate efforts to identify users to receive offers (e.g., to participate in a survey) even when the offer criteria are relatively specific.

As noted above parenthetically, the techniques for identifying survey candidates are also applicable more broadly to identifying people to participate in offers generally. For example, marketers may wish to target people for particular discounts based on the location history of those people. Anonymous users who meet offer criteria are identified, presented with the offer, and given the option of accepting the offer and, in some use cases, revealing their identity in exchange for some reward specified by the offer. Thus, while the techniques described herein are discussed with reference to market research surveys, it should be appreciated that such techniques are more broadly applicable and that the opportunity to participate in a survey is just one type of offer that may be presented to otherwise anonymous people by using the techniques described below.

FIG. 1 illustrates an example of a survey-participant identification system 10 and a survey-candidate client device 12 that protect user privacy. In particular, the components 10 and 12 cooperate to identify users who are qualified to receive offers, such as offers to participate in surveys, based in part on the location history of the client device 12, e.g., as measured by a global-positioning-system sensor on the device. Because users are often protective of this information, the components 10 and 12 maintain anonymity of the user with respect to the location history until the user elects to identify themselves. Anonymous users are selected based on their corresponding location history, and then the device 12 presents the user with the opportunity to accept the offer and reveal themselves. Maintaining user anonymity is expected to encourage a relatively large user base to participate in data acquisition, thereby allowing those who wish to make offers to users based on relatively specific criteria to identify users consistent with the criteria.

The system 10 and devices 12 communicate via the Internet 14 and, in some cases, various networks by which devices 12 connect to the Internet 14, such as cellular networks, wireless local area networks, and the like. The system 10 is shown as communicating with three client devices 12, but substantially more devices are expected to participate, e.g., on the order of thousands, tens of thousands, or hundreds of thousands of such devices. Accordingly, in some embodiments, the system 10 may include or be embodied by a server, or a collection of servers, such as dedicated rack-mounted servers, or virtualized servers in a data center, having load balancing servers supporting processing multiple transactions concurrently on instances operating in parallel.

Also communicating with the system 10 is a surveyor client device 16, which in some embodiments, provides (at the direction of the surveyor) criteria for surveys, surveys themselves, selections of candidates, and other commands to the system 10. Device 16 further receives from the system 10, in some embodiments, instructions for constructing interfaces, such as Web-based interfaces presented in a browser, for entering commands and viewing results of surveys or the status of requests for survey candidates. In some embodiments, a party wishing to conduct a survey (a surveyor—or for offers more generally, an offeror), enters survey (or more generally, offer) criteria into the interface on the client device 16, and submits the criteria to the system 10. Later, after the system 10 and devices 12 identify candidates willing to reveal their identity, the party conducting the survey is alerted via the client device 16 and is presented with results of the search, by which the surveyor can select candidates to participate in the survey and, in some embodiments, command the system 10 to administer the survey in conjunction with the devices 12.

The system 10 and device 12 are each described with reference to a number of functional blocks that may be embodied as code stored in memory of one or more properly programmed computing devices and executed by one or more processors of those devices, examples of which are described below. The code by which this functionality is implemented may be executed by one computing device or several computing devices and various functions may be parallelized on multiple computing systems or multiple processes of a computing system. Further, the code by which the functionality described below is implemented may be organized differently than as illustrated, for example, code for the various functional blocks may be conjoined, divided, distributed, or intermingled.

In some embodiments, the survey-participant identification system includes an anonymous location-history data store 18, an anonymous candidate tracker 20, an anonymity-management module 22, and a survey participant data store 24. Each of these components exchanges information with one another in order to gather data about anonymous candidates, discern which anonymous candidates meet survey criteria, and give candidates the opportunity to reveal themselves.

In some embodiments, the anonymous location-history data store 18 stores data about the locations of users while preserving user anonymity. In some embodiments the anonymous location history data store is a relational database or a collection of documents (e.g., encoded in a serialized data format such as XML or JSON) about users. The data store 18 may include a plurality of records, each record including an anonymous identifier (e.g., an anonymous pseudonym uncorrelated to information sufficient to uniquely identify the user) of the user and a location history of that user. The location history may be acquired from the client devices 12 and stored in these records and updated. Location history may be expressed in a variety of formats selected based on trade-offs between memory usage, anonymity, and desired resolution for specifying location. For example, location may be expressed in absolute terms, e.g.

latitude and longitude, or in relative terms, for example with reference to proximity to some landmark. In another example, location may be expressed with reference to geographic areas in which the user is located, such as zip codes, cities, states, and the like. Each record may include a plurality of locations, each location being associated with the time at which the user was at that location, for example in a log listing location every 15 minutes or hour. Each location may also be associated with a confidence value indicating the likelihood that the reported location is accurate, as is often associated with coordinates reported by GPS units in devices 12. The determination of location may be made solely based on GPS signals, based on GPS and other wireless signals, or without reference to GPS signals, e.g., by geocoding an IP address. The records may also include other data, provided that users choose to reveal this information. For example, the system 10 may collect information that does not, in the aggregate, identify a user uniquely, but would still be of interest to marketers, such as gender, approximate income level, approximate age, or medical history. Quantum for specifying these parameters may be selected to form relatively broad bins to avoid identifying users, as might otherwise occur if a relatively large amount of information is collected.

The anonymous identifiers may be arbitrarily generated values, such as numbers output by a counter that increments with each new user. Generally, the anonymous identifier is not correlated with the user's identity other than to identify a record that reflects location-history data from the user's device 12. In some embodiments, the anonymous identifier may be generated based on user data, by using techniques to obfuscate the user's identity, such as a properly salted cryptographic hash of the users name and telephone number, e.g., a MD5, SHA-0, or SHA-1 hash. The anonymous identifiers may be unique to a user within the data store 18, but otherwise provide little to no information by which the user can be uniquely identified or relatively specifically identify, e.g., as a member of a group that constitutes less than 0.01%, 0.1%, or 10% of the population, depending on the desired degree of anonymity and resolution of data.

In some embodiments, the anonymous location history data store 18 is only partially anonymous, and each record includes a telephone number or email address, but not a name, for the users, so that messages can be sent to client devices 12, for example e-mails, text messages, or messages to an application running on client devices 12. Or in some embodiments, the system 10, including the data store 18, does not store any information by which a user can be identified (e.g. named by being uniquely identified, or identified as a member of a relatively small portion of the population, such as less than 1%). In these embodiments, information is exchanged with client devices 12 by client devices 12 initiating communication with the system 10 and pushing information to or pulling information from the system 10, for example over the Internet 14, in some embodiments using one or more proxy servers, such as the Tor anonymizing service, to conceal the identity of the users associated with devices 12 by preventing an IP address of the user device 12 from reaching the system 10 in packet headers. In such systems, communications from the client devices 12 may include the anonymous identifier, e.g., as a header in a protocol at the application layer by which the system 10 and device 12 communicate. The anonymous identifier is stored on client devices 12 as well, and the system 10 may associate information in such communications with the anonymous identifier, but not the individual user, until the user elects to reveal themselves. In some embodiments, the client device encrypts the identifier based on uniquely identifying information (e.g., name, social security number, etc.), and when the user elects to reveal themselves, the client device sends an encryption key to decrypt this information.

The system 10 further includes, as noted above, an anonymous-candidate tracker 20 in this embodiment. The anonymous-candidate tracker may create new accounts—each account having a record in the data store 18—and direct the data store 18 to associate data with those anonymous accounts, such as later acquired location histories, using the anonymous identifier. The anonymous-candidate tracker may be configured to obtain data about users without obtaining (or retaining, if provided without intent to disclose the user's identity) the user's identity or information by which the user is readily identified, for example a user IP address, UDID, MAC address, or phone number that may accompany some communications from the user.

In this embodiment, the tracker 20 includes an anonymous account creator 24 and an anonymous-data intake module 26. The account creator 24 receives information from devices 12 to create new accounts, e.g., upon a user downloading and installing the below-described application. When creating a new account, the account creator 24 may create the above-mentioned cryptographic hash based on user information, or the value may be generated by the application executing on the client device to avoid conveying such information to the system 10. In some embodiments, the system 10 may validate such a value to confirm the absence of collisions with other hash values for other others. Or at this time, the account creator 24 may generate the above-mentioned arbitrary value that is not indicative of the user's identity. The resulting anonymous identifier is provided to the data store 18 along with instructions to create a new record for receiving data and storing data associated with the anonymous identifier. The account creator 24 may also report the anonymous identifier back to the client device 12 (if generated at the system 10), so the client device 12 can reference the anonymous identifier in future communications, to indicate where location histories and other data should be stored, without divulging the user's identity. To this end, the anonymous-data intake module 26 may receive communications from the devices 12, for example communications reporting location histories, that include the anonymous identifier, and command the data store 18 to store the reported data in the record associated with the anonymous identifier.

The anonymity management module 22 of some embodiments manages the process by which anonymous candidates are selected and those candidates are presented the opportunity to reveal themselves. Further, in some embodiments, the anonymity management module 22 manages the activities that follow candidate identification, such as administering surveys or other offers. In this embodiment, the module 22 includes a survey-criteria intake module 28, an anonymous-candidate-query module 30, a candidate-invite module 32, and a survey-participant identifier 34.

The survey-criteria intake module 28 acquires the criteria by which anonymous users are selected to be presented with the opportunity to participate in a survey or accept some other offer. To this end, the module 28 may serve to the surveyor client device 16 information by which an interface is presented for selecting criteria (e.g., HTML, JavaScript, and the like for constructing an interface in a browser). In some embodiments, the interface is presented in a browser of the client device 16, and the survey-criteria intake module 28 manages a session by which this interface is presented and selections are received from the client device 16.

For example, the survey-criteria intake module 28 may present an interactive map interface on the client device 16 with which the surveyor can select areas corresponding to zip codes or streets, or otherwise indicate a geographic area to specify criteria, e.g., by drawing a bounding box or specifying a center point and radius corresponding to a geographic area in which a candidate must have been present to satisfy the criteria. In some embodiments, the interface presents the surveyor with the option of selecting a particular geographic feature, and some proximity to that feature, for example a road or a building of interest to the surveyor. Upon identifying a geographic area in which the candidate must have been, the interface may also solicit a temporal window from the surveyor, indicating a time during which a user must be in the area that is selected, such as during rush hour on the 405 in California.

The interface may also present inputs for other criteria that can be satisfied by information stored in the data store 18 (e.g., gender, if stored), or in some embodiments, the interface may present the surveyor with the option of entering additional questions for anonymous users to answer when it is determined that the user is otherwise a candidate for a survey. For instance, the surveyor may be interested in people who are on blood pressure medication who traveled the 405 out of Los Angeles between May 1 and May 15 during rush hour, but the data store 18, in some embodiments, does not include information about whether the person is on blood pressure medication. In this use case and embodiment, when it is determined that the user satisfies the location history criteria, a surveyor provided question relating to blood-pressure medication is presented to the anonymous user on device 12, and if the anonymous user provides an answer specified by the surveyor, then the user is presented with the opportunity to reveal themselves or (i.e., and/or) participate in the survey.

In some embodiments, the survey criteria intake module 28 creates a record for each surveyor, such as an account, and each record may include records for a plurality of surveys, each survey record including the survey criteria entered in the above-mentioned interface. These records may be stored in memory of the survey criteria intake module 28 and evaluated, e.g., periodically to determine which candidates satisfy the criteria if the search is forward looking in time.

In some embodiments, upon a surveyor specifying criteria to the intake module 28, the criteria may be communicated to the anonymous-candidate-query module 30, which may ascertain which anonymous identifiers in the data store 18 satisfy the criteria, or satisfy as much of the criteria as can be addressed with the information available, for example in the case in which the surveyor provides additional questions to be presented to the anonymous candidates. The query module 30 constructs queries from the criteria, for example queries expressed in structured query language or xpath, and queries the data store 18, which responds with information about anonymous users who satisfy the criteria. Or the module 30 may iterate over every record to ascertain which records satisfy the criteria.

The responsive anonymous identifiers are communicated by the query module 30 to the candidate-invite module 22, which communicates invitations to devices 12 of users associated with the anonymous identifiers. The process of communicating to the devices 12 may be selected based on trade-offs between complexity and robustly protecting anonymity. For example, phone numbers or e-mail addresses of users may be stored, but the users' names may remain unknown. In such an embodiment, with less protection for privacy, invitations may be communicated to the e-mail address or the phone number or some other address of the user, such as an address by which communications are provided to user devices 12. In one example, a special-purpose email account is created for the user when a new account is formed to avoid gathering data otherwise linking to the unique identity of the user. In other embodiments, the system 10 does not contain information by which the system 10 can communicate with devices 12 for anonymous users, and invitations are pulled, e.g., periodically, by the devices 12. For example, an application on user devices 12 may periodically communicate a request for new invitations to the invite module 12, including with the request the anonymous identifier corresponding to the user of the user device 12. This communication may occur over the Internet 14, such as over one or more proxy servers that conceal from the system 10 the IP address of the user device 12. In response to such a request, the candidate-invite module 32 may ascertain whether the anonymous user identifier is associated with any invitations, and transmit over the Internet 14 to device 12 responsive invitations. In this embodiment, addresses of the client devices 12 remain unknown to the system 10 until an invitation is accepted, thereby further enhancing privacy.

Upon receiving such an invitation, client devices 12 may determine whether the invitation includes additional criteria required by the surveyor to determine whether the user meets all of the survey criteria. If additional criteria are specified, one or more questions may be presented to the user on a user interface on client device 12, and if the user's answers satisfy the additional criteria, the user is presented with an offer interface. The offer interface may identify attributes like the benefit to the user for participating in the survey or for accepting some other offer, such as a cash payment, a coupon, or a discount, and the interface may include a user selectable button by which the user accepts the offer, e.g., on a touchscreen.

Acceptance is transmitted by the client device 12 back to the survey-participant identifier 34 along with additional information about the user, such as the user's name, the user's street address, the user's answers to the additional criteria answered on the user device if present, and other information potentially useful to a surveyor or marketer. Such information that uniquely identifies the user is stored by the survey-participant identifier module and is associated with the survey in question. This information may be made available to the surveyor client device 16 in a survey management module by which the surveyor may administer a survey to these candidates through the client devices 12. Or in some embodiments, the identifying information is transmitted to the surveyor client device 16 or a surveyor-operated server, without disclosing the information to the system 10, thereby preventing any one party from having both the full-set of location information and the user identification information. In some embodiments, the client devices 12 communicate to the system 10 that an invitation has been received, with an acknowledgment signal, but not more about whether the user accepts the offer, so the same offer is not re-sent, but the system 10 does not receive the user identification information.

In some embodiments, the information sufficient to uniquely identify the user remains uncorrelated with the anonymous identifier in the system 10, so that even after providing their name, for example, the user's location history remains uncorrelated with their identity, with the exception of the fact that the user satisfied location related criteria. In some embodiments, the client devices 12 may delay returning the user identification for some arbitrarily selected amount of time, for example based on a pseudorandom or random value, to leave the identification uncorrelated with the invitation, as multiple invitations may be sent before responses are received, and responses may arrive out of the order in which the invitations were submitted.

Information about the non-anonymous users may be stored in the survey participant data store 24, which may include a plurality of records about users, each record including a username, user contact information (e.g. phone number, address, e-mail address, and the like), user responses to survey questions, and information about the reward for participating in the survey, such as an indicator of whether the reward has been conveyed or accepted.

Each of the survey-candidate client devices 12, given appropriate permissions by the user solicited at the time of installation, tracks the user's location and communicates with the system 10 to selectively reveal the user's identity when the user's location history qualifies them as a candidate for an offer, such as an offer to participate in a survey, and the user elects to reveal their identity by accepting the offer. In some embodiments, the survey-candidate client devices are battery powered handheld mobile computing devices, such as smartphones or tablet computers operative to communicate wirelessly via wireless local area networks, cellular networks, and the Internet.

The client devices 12 each include a wireless-network interface 36, a location detector 38, and a survey-candidate client application 40 stored in a tangible, non-transitory, machine-readable memory of the devices 12 and executed by the processors of the devices 12. The illustrated wireless-network interface 36 may include antennas and transceivers for communicating on various types of networks, such as Wi-Fi networks and cellular networks. These networks, in turn, may connect to the Internet 14 or other networks by which information is exchanged with the system 10. Such communications may be encrypted, e.g., using secure-socket layer encryption, or other encryption techniques at both the application layer and lower layers to protect privacy.

The illustrated location detector 38 may include various types of hardware and software for determining the location of the client device 12, such as a global positioning system module, or hardware and software for triangulating the position of the device 12 based on the wireless environment of the device 12, e.g. signals from cellular towers or wireless networks in range of the device 12. Determining the position may include reporting aspects of the wireless environment to some other remote server that determines the location and reports the position back. The location detector 38 may be operative to output a location of the client device 12 and a uncertainty value associated with that location, such as a radius within which the client device is likely to be with more than a threshold certainty, e.g. 90%. In some embodiments, survey criteria specifying a location also specify a threshold certainty that must be exceeded.

The location data from the location detector 38 may be communicated to the survey-candidate client application 40, for example periodically, or as requested by the client application 40, such as via an application program interface of an operating system of the client device 12, examples of which include the iPhone operating system, the Android operating system, the Windows Phone operating system, or the Windows Mobile operating system. The survey-candidate client application 40 includes various modules that may be embodied by code executing on a processor of the client device 12. Such code may be differently organized than as is presented in FIG. 1 while still providing the functionality described herein. In this embodiment, the client application includes an anonymous-location tracker 42 and a survey-invite receptor 44.

The anonymous-location tracker 42 retrieves locations from the detector 38 and communicates (e.g., issues commands that cause the communication to be effectuated) those locations to the place in which they are stored, either in the data store 18 of the system 10 or locally on the client device 12. The gathered locations are also associated with (e.g., in a one-to-one relationship) a timestamp indicative of the time at which the location was sensed based on a clock of the client device 12 or a clock signal received from the wireless-network interface 36 or the location detector 38. This location history may be stored in the client device 12, for example in a buffer, for transmission to the system 10 via the wireless-network interface 36 when some quantum of data has been acquired, when a wireless connection is reestablished after some period without service, or when requested by the system 10, depending upon the embodiment and use case. The communicated location history may be associated with the anonymous identifier, which is stored in memory of the client device 12 accessible to the client application 40, when the location history is communicated to the system 10, so that the system 10 can store the location history in the appropriate record in the data store 18.

As noted above, in some embodiments, the location history is communicated to the system 10 by pushing the location history to the system 10 without receiving a request for the location history (e.g., during a reporting session) in order to avoid the need for storing an address of the client device 12 in the system 10. And as noted above, such communications may be conveyed over the Internet 14 via a proxy server that conceals the IP address through which the device 12 communicates information into the Internet 14. The client application 40 may store in memory Internet addresses of a number of proxy servers or other services for effectuating anonymous communication. Upon a given communication failing, e.g., as indicated by the absence of an acknowledgement signal at the transport level, a different proxy server may be selected in such embodiments.

In other embodiments, the location history remains on the client device 12, e.g., until the user of the client device 12 decides to reveal themselves. Keeping location history client-side is expected to increase the anonymity provided by the system of FIG. 1, but like other aspects described herein, not all embodiments use this technique. A process for storing location history client-side and evaluating survey criteria at the client is described below with reference to FIG. 3, and such a process may be executed by the client application 40 of FIG. 1.

The client application 40 also includes a survey-invite receptor 44 that receives invitations to participate in surveys or except other offers. In some embodiments, the survey-invite receptor 44 periodically, or in response to a user request, retrieves invitations from the candidate-invite module 32 of system 10. As noted above, in some embodiments, the system 10 does not contain an address in memory by which the system 10 can communicate with the client device 12, as such, invitations may be pulled by the invite receptor 44 by transmitting to the system 10 the anonymous identifier and a request for invites via one or more of the above-mentioned proxy servers or other anonymizing services over the Internet 14. Or such communications may be received by system 10 with the IP address of the client device 12 in the IP packet headers, but the system 10 may discard this information.

The client application 40 may run, in one mode of operation, as a background process on the client device 12, gathering location history and periodically reporting updates, in some embodiments, and pulling invitations conveying offers, e.g., to participate in a survey. And in the embodiments implementing the process of FIG. 3 by which location histories are stored client-side, the client application may periodically retrieves survey criteria from the system 10 and perform the functions of the above-mentioned candidate-query module 30 for the particular user associated with the device 12 to determine whether the location history stored on the client device 12 satisfies the criteria, in which case the invitation may be retrieved or if already retrieved, presented to the user of the device 12.

A user interface of the client device 12, such as a touchscreen, may facilitate a number of interactions with the user. For example, the application 40 may present a visual display by which a user establishes a new anonymous account via the account creator 24 described above. In such a use case, the user may grant certain permissions to the application 40 to gather location information, and the application 40 may receive an anonymous identifier from the anonymous account creator 24 (or create one itself and communicate the identifier to system 10) and store the anonymous identifier in memory accessible to the client application 40 on the client device 12. Further, a user interface of the application 40 may inform the user when the user has the option of accepting an offer, such as an offer to participate in a survey or accept a discount. In response to such an invitation, the client application 40 may communicate a command to an application program interface of the operating system of the client device 12 causing the client device 12 to vibrate or emit audio to signal the user. In other embodiments, the user may be informed of such an offer via a text message or email to which the user may respond with information by which the user is identified.

Further, in some embodiments, the client application 40 includes a module by which surveys are administered. In such embodiments, a user accepting an invitation causes the client application 40 to retrieve a survey from the system 10 and present questions of the survey to the user and gather the user's answers in a user interface of the application 40, e.g., by receiving touch-based inputs on a touch screen. These answers may then be returned to the system 10 for presentation to the surveyor operating the client device 16 and subsequent analysis.

In summary, device 12 and system 10, in the above described embodiments, can cooperate to identify candidates for surveys that have relatively specific location-based criteria, while preserving a user's privacy with respect to the user's location history. In some embodiments, the location history is stored in the system 10 and only linked to the user by an anonymous identifier, by which invitations can be communicated to candidates, but that does not uniquely identify the candidate outside of the system 10. And in some embodiments, location history is stored in the client device 12, but not the system 10, for anonymous users, and survey criteria relating to location are evaluated on the client device 12, preventing an operator of the system 10 from accessing a user's location history without the user's permission.

Figure 2:
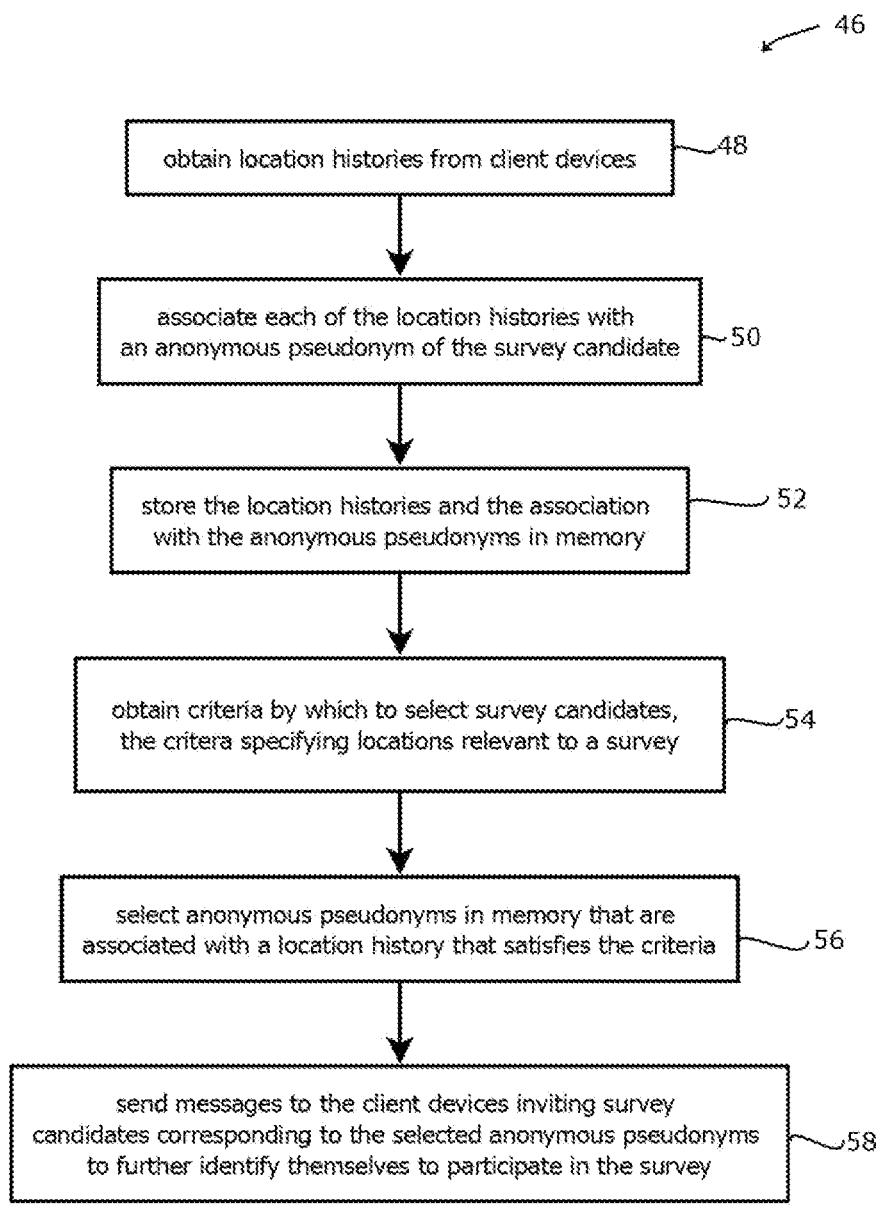
FIG. 2 illustrates an example of a process for selecting candidates to receive offers based on each candidate's location history while preserving each candidate's privacy, a process that is performed by some embodiments in accordance with the system of FIG. 1.

FIG. 2 illustrates an example of a process 46 for selecting survey participants based on location history while preserving privacy of such candidates. The process 46 may be executed by some embodiments of the system 10 described above, such as those embodiments in which location history is stored on the side of the system 10.

The process 46, in this embodiment, begins with obtaining location histories from client devices, as illustrated by block 48. Location histories may be obtained by the anonymous-data intake module 26 described above with reference to FIG. 1. As noted above, the location histories may be obtained with timestamps, corresponding locations, and an anonymous identifier, and without information by which the user can be uniquely identified without their consent.

Next, in this embodiment of process 46, each of the location histories is associated with an anonymous pseudonym (or some other anonymous identifier) of a survey candidate, as illustrated by block 50. This association may be a one-to-one association maintained by the above-described data store 18 of FIG. 1, which may also store the location histories and the association with the anonymous pseudonym in memory, as illustrated by block 52 of process 46.

The process 46 of this embodiment further includes obtaining criteria by which to select survey candidates, where the survey criteria specify locations relevant to a survey, as illustrated by block 54. This step, like the other steps described herein need not necessarily be performed in the order illustrated. Survey criteria may be obtained by the intake module 28 described above with reference to FIG. 1 from the surveyor client device 16.

Next, anonymous pseudonyms each associated with a location history that satisfies the criteria are selected, as illustrated by block 56. This step may be performed by the above-described anonymous-candidate-query module 30 of FIG. 1.

Next in this embodiment, messages are sent to the client devices inviting survey candidates corresponding to the selected anonymous pseudonyms to further identify themselves to participate in the survey, as illustrated by block 58. This step 58 may be performed by the above-described candidate-invite module 32 of FIG. 1.

In some embodiments, the process 46 further includes receiving information by which the candidates can be identified from candidates who accept the invitation. As a result, in some embodiments, candidates satisfying potentially relatively specific survey criteria relating to location history can be identified, while preserving the privacy of those candidates who do not wish to participate or do not satisfy the criteria. The process 46 is applicable to offers other than those relating to an offer to participate in a survey, such as discounts based on location history and coupons based on location history. Further, the process 46 is not limited to the system 10 described above with reference to FIG. 1 and can be implemented in other systems.

Figure 3:
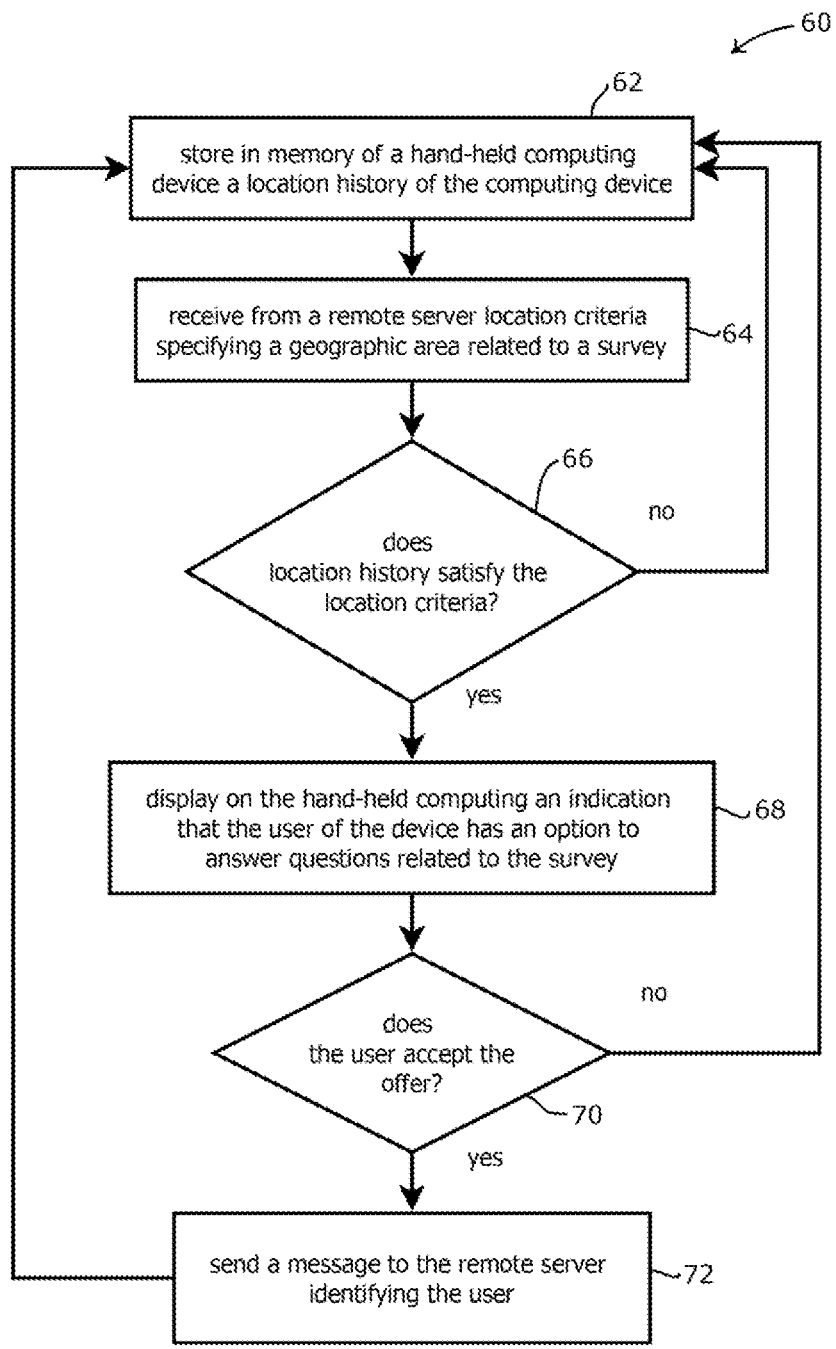
FIG. 3 illustrates another example a process for selecting candidates to receive offers based on each candidate's location history while preserving privacy, a process that is performed by some embodiments in accordance with the system of FIG. 1.

FIG. 3 illustrates another example a process 60 for selecting survey participants based on the location history of those participants while preserving the participant's privacy. The process 60 may offer even greater privacy than the process 46 of FIG. 2, in some use cases, by storing the location history on the side of the client device. The process 60 may be executed by a processor of each client device 12 described above with reference to FIG. 1.

In some embodiments, the process 60 includes storing in memory of a hand-held computing device a location history of the computing device, as illustrated by block 62. This step may be performed by the above-described survey-candidate client application 40 in cooperation with the location detector 38 of FIG. 1. The location history may be stored in persistent memory of the client device, such as flash memory, that retains information when the client device is turned off, or when a battery or other sources of power are removed from the client device. In some embodiments, location history is stored in a database on the client device, such as a SQLite database or in a serialized data format, such as XML or JSON.

In some embodiments, each location in the location history may be encrypted, for example with a cryptographic hash, with less granularity than is measured, such that the location history is not readily discerned by inspecting the device, and survey criteria may be evaluated by applying the same cryptographic hash to the location in the criteria to determine whether the hash value matches one in memory. For instance, a zip code of 78703 and time stamp of Sep. 1, 2012 5 PM may be added to the location history by applying a MD5, SHA-0, SHA-1 or other cryptographic hash algorithm to the string "78703 Sep. 1, 2012 5 PM," and storing the resulting value. And in this example, if the user moves to a different zip code of 78701 an hour later, another entry may be added by applying the same hash function to, e.g., 78701 Sep. 1, 2012 6 PM." This technique may be applied by recording location history at a lower level of granularity than latitude and longitude, for example at the level of zip code or by truncating less significant digits from a latitude and longitude of the location measured by the client device. Similar transformations may be performed on timestamps, for example truncating timestamps to individual days, or hours.

Hashing the combined time-stamp and location prevents the location history from being readily inspected, and lowering the granularity of time and place facilitates application of criteria without decrypting the location history, as the same cryptographic hash may be applied to the criteria and matched to stored values. For example, a criteria specifying a given ZIP code on a given day, at a given hour, will hash to a value in memory of the client device indicative of whether the client device was in that ZIP code on that day. In some embodiments, survey criteria may be expressed as alternative criteria so that a range of encrypted location/time values can be matched, for example if locations and times in the location history are expressed in encrypted zip codes and days, a survey criteria that is satisfied by any of four days for any of four zip codes may be satisfied by applying 16 different conditions as alternative criteria, with each condition yielding a cryptographic hash of one of the permutations of one of the days and one of the zip codes. Other embodiments may not apply encryption to the location history, or may decrypt the location history for application of survey criteria before re-encryption, which is not to suggest that any other feature may not also be omitted in some embodiments.

The process 60 in this embodiment, further includes receiving from a remote server location criteria specifying a geographic area related to a survey, as indicated by block 64. The criteria may be received from the above-mentioned anonymous candidate query 30 over the Internet 14 by the client application 40 of FIG. 1.

Next in some embodiments, the process 60 includes determining whether the location history satisfies the location criteria, as indicated by block 66. As noted above, in some embodiments, both the location history and the location specified in the criteria are encrypted and matched so that location histories may be stored in an encrypted format on the device 60, potentially preserving privacy. After determining that the location history does not satisfy the criteria, the process returns to block 62 in response. Alternatively, after determining that the location history does satisfy the criteria, the process 60 of this embodiment proceeds to display on the hand-held computing device an indication that the user of the device has an option to answer questions related to the survey or accept some other offer, as indicated by block 68. This step may be performed by the above-mentioned client application 40 of FIG. 1, for example on a touch screen of the user device. Further, it should be noted that in some embodiments, the display indicates that the user has the option to accept an offer in exchange for revealing information about themselves, as the present techniques are not limited to surveys.

Next, it is determined whether the user accepts the offer, as indicated by block 70, e.g., by touching a portion of a touch screen interface on the device 12 by which the user expresses acceptance. After determining that the user does not accept the offer, the process 60 of this embodiment returns to step 62. Alternatively, after determining that the user does accept the offer, the process 60 of this embodiment proceeds to send a message to the remote server identifying the user, as indicated by step 72. This step may be performed by the above-mentioned client application 40 using the wireless interface 36 of FIG. 1. The process 60, in some embodiments, may also include receiving a reward from the remote server 10, such as information by which a financial reward may be claimed, e.g., information by which a discount may be obtained. Further, the process 60, in some embodiments, may include receiving from the remote server a survey, administering the survey to a user, and reporting the user's survey results back to the remote server.

The process of FIG. 3 is expected to select survey participants while potentially preserving the users' privacy with respect to their location histories. In some embodiments, the process is expected to be robust to subpoenas to the entity operating the remote server, and some embodiments are further expected to be robust to efforts by someone inspecting the device on which the location history is stored to discern the location history.

Figure 4:
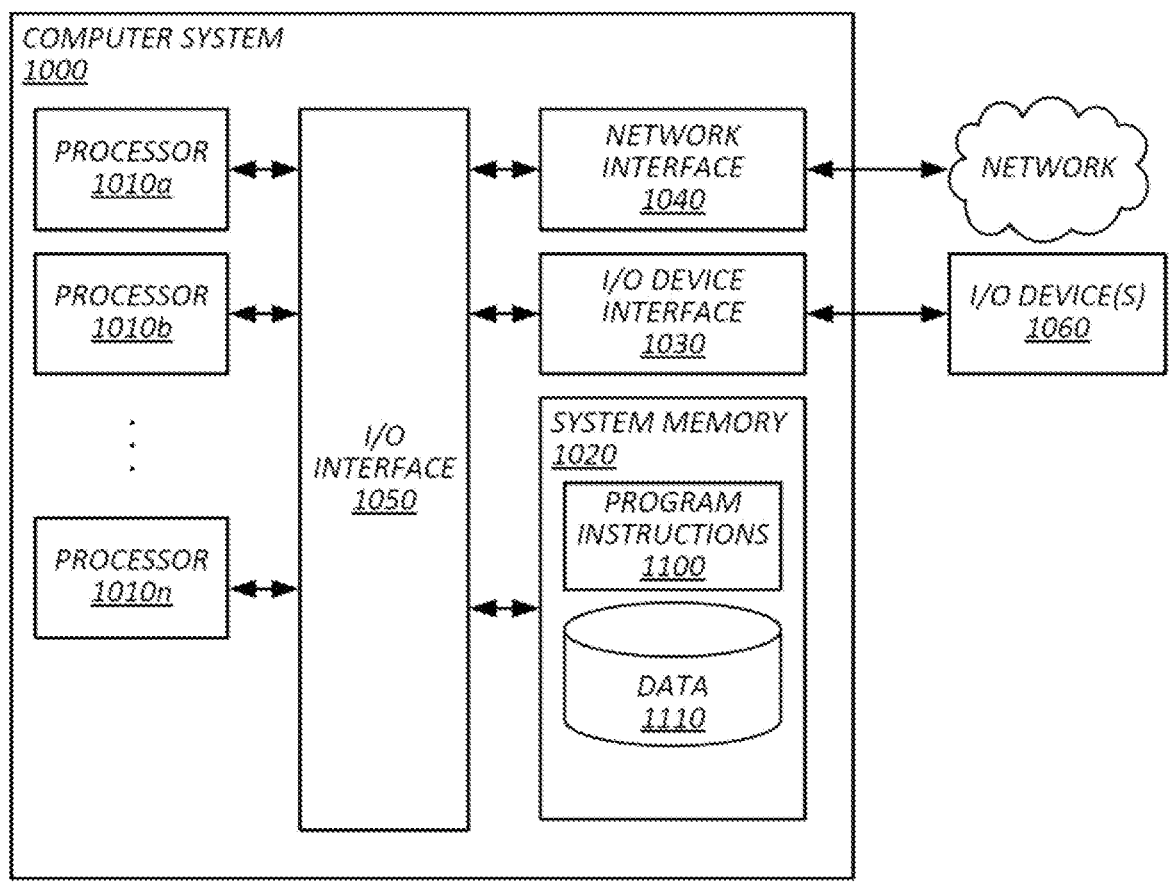
FIG. 4 illustrates an example of a computing system by which components of some embodiments of the system of FIG. 1 are formed.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A tangible, non-transitory, machine-readable memory storing instructions, that when executed, cause one or more processors to perform operations comprising:

sensing, with a location detector of a mobile computing device, locations of the mobile computing device a plurality of times over a duration of time to obtain a location history of time-stamped geolocations of the mobile computing device spanning a plurality of days;

determining, with one or more processors of the mobile computing device, reduced resolution versions of the time-stamped geolocations in the location history, the reduced resolution versions having less resolution than sensed locations;

determining, with a cryptographic hash function, with the one or more processors of the mobile computing device, a first set of cryptographic hash values each based on a respective time-stamp and respective location of a respective reduced resolution version of the time-stamped geolocations in the location history;

storing in memory of the mobile computing device the first set of cryptographic hash values based on the location history of the mobile computing device;

receiving, at the mobile computing device, from a remote server, via a wireless interface of the mobile computing device, location criteria specifying a geographic area related to a survey, the location criteria being sent from the remote server to a plurality of candidate computing devices including the mobile computing device;

in response to receiving the location criteria, accessing, with the one or more processors of the mobile computing device, the first set of cryptographic hash values based on the location history of the mobile computing device stored in memory of the mobile computing device;

determining, with the one or more processors of the mobile computing device, whether the location history satisfies the location criteria that specifies the geographic area related to the survey from the remote server, without decrypting the first set of cryptographic hash values based on the location history, without revealing the location history to the remote server, and without the location history being accessible via inspection of the mobile computing device, wherein:

the location history is determined to satisfy the location criteria by determining whether any cryptographic hash values in the first set of cryptographic hash values match any cryptographic hash values in a second set of cryptographic hash values, and the second set of cryptographic hash values are each determined with the cryptographic hash function based on different subsets of the location criteria, the location criteria being at a same granularity as the reduced resolution versions of the time-stamped geolocations in the location history; and after determining that the location history satisfies the location criteria, displaying on the mobile computing device an indication that a user of the mobile computing device has an option to answer questions related to the survey, wherein determining reduced resolution versions of the time-stamped geolocations in the location history and determining the first set of cryptographic hash values comprises, for a given time-stamped geolocation in the location history;

reducing a granularity of a location of the given time-stamped geolocation to a predetermined location granularity;

reducing a granularity of a time of the given time-stamped geolocation to a predetermined time granularity;

combining a resulting reduced-granularity location and reduced-granularity time into a string; and hashing the string with the cryptographic hash function.

2. The memory of claim 1, wherein displaying that the user has an option to answer questions related to the survey comprises inviting the user to provide data relating to criteria other than location to determine whether the user is a candidate for the survey.

3. The memory of claim 1, comprising:
sending a message to the remote server indicating that the location history satisfies the location criteria.

4. The memory of claim 3, the operations comprising:
receiving the survey; and
administering the survey to the user; and
sending survey results obtained by administering the survey.

5. The memory of claim 1, the operations comprising:
periodically obtaining locations from a global-positioning system (GPS) device of the mobile computing device; and
sending at least part of the location history to the remote server in response to receiving a user election to answer the questions.

6. The memory of claim 1, comprising:
upon ascertaining that the location history satisfies the location criteria, displaying a reward for participating in the survey.

7. The memory of claim 1, wherein:
determining whether the location history satisfies the location criteria that specifies the geographic area related to the survey from the remote server comprises:
obtaining survey criteria expressed as alternative criteria;
determining one or more combined time-stamps and locations for each alternative criteria; and
determining the second set of cryptographic hash values comprises determining a cryptographic hash value of each of the one or more combined time-stamps and locations determined for each alternative criteria, the cryptographic hash values determined with the cryptographic hash function being at a same granularity as the reduced resolution versions of the time-stamped geolocations in the location history.

8. The memory of claim 7, wherein:
the survey criteria include N alternative times and M alternative geolocations, where N and M are integer values greater than one;
determining the second set of cryptographic hash values comprises determining a cryptographic hash value of each of alternative criteria comprises determining N times M cryptographic hash values corresponding to each combination of the alternative times and alternative geolocations.

9. The memory of claim 1, wherein receiving, at the mobile computing device, from a remote server, via a wireless interface of the mobile computing device, location criteria comprises:
obtaining the location criteria via an anonymizing proxy server with a pull request.

10. The memory of claim 1, wherein:
sensing locations comprises obtaining locations with steps for obtaining locations.

11. The memory of claim 1, wherein:
receiving location criteria comprises performing steps for obtaining survey criteria.

12. The memory of claim 1, wherein:
the operations comprise sending at least part of the location history to the remote server after ascertaining the location history in memory satisfies the location criteria in response to a user providing permission to send the at least part of the location history.

13. The memory of claim 1, wherein determining reduced resolution versions of the time-stamped geolocations in the location history comprises:
selecting an identifier from a set of identifiers to reduce the granularity of a location of a given time-stamped geolocation responsive to coordinates of the location indicating a geographic area corresponding to the identifier, wherein:
the location of the given time-stamped geolocation includes the coordinates, as measured by the location detector, and
the set of identifiers have a predetermined granularity less than location coordinates and each identifier in the set corresponds to a given geographic area.

14. A method, comprising:
sensing, with a location detector of a mobile computing device, locations of the mobile computing device a plurality of times over a duration of time to obtain a location history of time-stamped geolocations of the mobile computing device spanning a plurality of days;
determining, with one or more processors of the mobile computing device, reduced resolution versions of the time-stamped geolocations in the location history, the reduced resolution versions having less resolution than sensed locations;
determining, with a cryptographic hash function, with the one or more processors of the mobile computing device, a first set of cryptographic hash values each based on a respective time-stamp and respective location of a respective reduced resolution version of the time-stamped geolocations in the location history;
storing in memory of the mobile computing device the first set of cryptographic hash values based on the location history of the mobile computing device;
receiving, at the mobile computing device, from a remote server, via a wireless interface of the mobile computing device, location criteria specifying a geographic area related to a survey, the location criteria being sent from the remote server to a plurality of candidate computing devices including the mobile computing device;

in response to receiving the location criteria, accessing, with one or more processors of the mobile computing device, the first set of cryptographic hash values based on the location history of the mobile computing device stored in memory of the mobile computing device;

determining, with the one or more processors of the mobile computing device, whether the location history satisfies the location criteria that specifies the geographic area related to the survey from the remote server, without decrypting the first set of cryptographic hash values based on the location history, without revealing the location history to the remote server, and without the location history being accessible via inspection of the mobile computing device, wherein:

the location history is determined to satisfy the location criteria by determining whether any cryptographic hash values in the first set of cryptographic hash values match any cryptographic hash values in a second set of cryptographic hash values, and the second set of cryptographic hash values are each determined with the cryptographic hash function based on different subsets of the location criteria, the location criteria being at a same granularity as the reduced resolution versions of the time-stamped geolocations in the location history; and after determining that the location history satisfies the location criteria, displaying on the mobile computing device an indication that a user of the mobile computing device has an option to answer questions related to the survey, wherein determining whether the location history satisfies the location criteria that specifies the geographic area related to the survey from the remote server comprises:

obtaining survey criteria expressed as alternative criteria;

determining one or more combined time-stamps and locations for each alternative criteria; and determining the second set of cryptographic hash values comprises determining a cryptographic hash value of each of the one or more combined time-stamps and locations determined for each alternative criteria, the cryptographic hash values determined with the cryptographic hash function being at a same granularity as the reduced resolution versions of the time-stamped geolocations in the location history.

15. The method of claim 14, wherein:

determining the first set of cryptographic hash values comprises:

for a given time-stamped geolocation in the location history:

reducing a granularity of a location of the given time-stamped geolocation to a predetermined granularity;

reducing a granularity of a time of the given time-stamped geolocation to a predetermined granularity;

combining a resulting reduced-granularity location and reduced-granularity time into a string; and hashing the string with means for cryptographically hashing the string.

16. The method of claim 14, wherein determining reduced resolution versions of the time-stamped geolocations in the location history comprises:

selecting an identifier from a set of identifiers to reduce the granularity of a location of a given time-stamped geolocation responsive to coordinates of the location indicating a geographic area corresponding to the identifier, wherein:

the location of the given time-stamped geolocation includes the coordinates, as measured by the location detector, and the set of identifiers have a predetermined granularity less than location coordinates and each identifier in the set corresponds to a given geographic area.

17. A mobile computing device, comprising:

one or more processors;

a location detector coupled to the one or more processors;

a wireless interface coupled to the one or more processors; and memory coupled to the one or more processors, the memory storing instructions that when executed by the one or more processors cause the one or more processors to perform operations comprising:

sensing, with the location detector of the mobile computing device, locations of the mobile computing device a plurality of times over a duration of time to obtain a location history of time-stamped geolocations of the mobile computing device spanning a plurality of days;

determining, with the one or more processors of the mobile computing device, reduced resolution versions of the time-stamped geolocations in the location history, the reduced resolution versions having less resolution than sensed locations;

determining, with a cryptographic hash function, with the one or more processors of the mobile computing device, a first set of cryptographic hash values each based on a respective time-stamp and respective location of a respective reduced resolution version of the time-stamped geolocations in the location history;

storing in the memory of the mobile computing device the first set of cryptographic hash values based on the location history of the mobile computing device;

receiving, at the mobile computing device, from a remote server, via the wireless interface of the mobile computing device, location criteria specifying a geographic area related to a survey, the location criteria being sent from the remote server to a plurality of candidate computing devices including the mobile computing device;

in response to receiving the location criteria, accessing, with the one or more processors of the mobile computing device, the first set of cryptographic hash values based on the location history of the mobile computing device stored in memory of the mobile computing device;

determining, with the one or more processors of the mobile computing device, whether the location history satisfies the location criteria that specifies the geographic area related to the survey from the remote server, without decrypting the first set of cryptographic hash values based on the location history, without revealing the location history to the remote server, and without the location history being accessible via inspection of the mobile computing device, wherein:

the location history is determined to satisfy the location criteria by determining whether any cryptographic hash values in the first set of cryptographic hash values match any cryptographic hash values in a second set of cryptographic hash values, and the second set of cryptographic hash values are each determined with the cryptographic hash function based on different subsets of the location criteria, the location criteria being at a same granularity as the reduced resolution versions of the time-stamped geolocations in the location history; and after determining that the location history satisfies the location criteria, displaying on the mobile computing device an indication that the user of the mobile computing device has an option to answer questions related to the survey, wherein:

the location criteria are expressed as alternative criteria and a range of encrypted location/time values are compared to the first set of cryptographic hash values, the second set of cryptographic hash values are each determined the with one or more processors of the mobile computing device, a given one of the location criteria specifies multiple time ranges; and the second set of cryptographic hash values comprises multiple hash values each based on the given one of the location criteria and a different one of the multiple time ranges.

18. The device of claim 17, wherein:
determining the first set of cryptographic hash values comprises:
for a given time-stamped geolocation in the location history:
reducing a granularity of a location of the given time-stamped geolocation to a predetermined granularity;
reducing a granularity of a time of the given time-stamped geolocation to a predetermined granularity;
combining a resulting reduced-granularity location and reduced-granularity time into a string; and
hashing the string with means for cryptographically hashing the string.

19. The device of claim 17, wherein determining reduced resolution versions of the time-stamped geolocations in the location history comprises:
selecting an identifier from a set of identifiers to reduce the granularity of a location of a given time-stamped geolocation responsive to coordinates of the location indicating a geographic area corresponding to the identifier, wherein:
the location of the given time-stamped geolocation includes the coordinates, as measured by the location detector, and
the set of identifiers have a predetermined granularity less than location coordinates and each identifier in the set corresponds to a given geographic area.

20. A tangible, non-transitory, machine-readable memory storing instructions, that when executed, cause one or more processors to perform operations comprising:
sensing, with a location detector of a mobile computing device, locations of the mobile computing device a plurality of times over a duration of time to obtain a location history of time-stamped geolocations of the mobile computing device spanning a plurality of days;
determining, with one or more processors of the mobile computing device, reduced resolution versions of the time-stamped geolocations in the location history, the reduced resolution versions having less resolution than sensed locations;
determining, with a cryptographic hash function, with the one or more processors of the mobile computing device, a first set of cryptographic hash values each based on a respective time-stamp and respective location of a respective reduced resolution version of the time-stamped geolocations in the location history;
storing in memory of the mobile computing device the first set of cryptographic hash values based on the location history of the mobile computing device;
receiving, at the mobile computing device, from a remote server, via a wireless interface of the mobile computing device, location criteria specifying a geographic area related to an offer, the location criteria being sent from the remote server to a plurality of candidate computing devices including the mobile computing device;
in response to receiving the location criteria, accessing, with the one or more processors of the mobile computing device, the first set of cryptographic hash values based on the location history of the mobile computing device stored in memory of the mobile computing device;
determining, with the one or more processors of the mobile computing device, whether the location history satisfies the location criteria that specifies the geographic area related to the offer from the remote server, without decrypting the first set of cryptographic hash values based on the location history, without revealing the location history to the remote server, and without the location history being accessible via inspection of the mobile computing device, wherein:
the location history is determined to satisfy the location criteria by determining whether any cryptographic hash values in the first set of cryptographic hash values match any cryptographic hash values in a second set of cryptographic hash values, and
the second set of cryptographic hash values are each determined with the cryptographic hash function based on different subsets of the location criteria, the location criteria being at a same granularity as the reduced resolution versions of the time-stamped geolocations in the location history; and
upon determining that the location history satisfies the location criteria, displaying on the mobile computing device an indication that an offer is available to the user of the mobile computing device, wherein:
the location criteria comprises a plurality of locations and a time range, and
the different subsets of the location criteria comprise permutations of the plurality of locations and times within the time range, each permutation corresponding to a different cryptographic hash value in the second set of cryptographic hash values.

21. The memory of claim 20, wherein:
determining the first set of cryptographic hash values comprises:
for a given time-stamped geolocation in the location history:
reducing a granularity of a location of the given time-stamped geolocation to a predetermined granularity;
reducing a granularity of a time of the given time-stamped geolocation to a predetermined granularity;
combining a resulting reduced-granularity location and reduced-granularity time into a string; and
hashing the string with means for cryptographically hashing the string.

22. The memory of claim 20, wherein determining reduced resolution versions of the time-stamped geolocations in the location history comprises:

selecting an identifier from a set of identifiers to reduce the granularity of a location of a given time-stamped geolocation responsive to coordinates of the location indicating a geographic area corresponding to the identifier, wherein:
  the location of the given time-stamped geolocation includes the coordinates, as measured by the location detector, and
  the set of identifiers have a predetermined granularity less than location coordinates and each identifier in the set corresponds to a given geographic area.

23. The memory of claim 20, wherein:
determining whether the location history satisfies the location criteria that specifies the geographic area related to the survey from the remote server comprises:
  obtaining survey criteria expressed as alternative criteria;
  determining one or more combined time-stamps and locations for each alternative criteria; and
  determining the second set of cryptographic hash values comprises determining a cryptographic hash value of each of the one or more combined time-stamps and locations determined for each alternative criteria, the cryptographic hash values determined with the cryptographic hash function being at a same granularity as the reduced resolution versions of the time-stamped geolocations in the location history.

24. The memory of claim 23, wherein:
the survey criteria include N alternative times and M alternative geolocations, where N and M are integer values greater than one;
determining the second set of cryptographic hash values comprises determining a cryptographic hash value of each of alternative criteria comprises determining N times M cryptographic hash values corresponding to each combination of the alternative times and alternative geolocations.

25. A tangible, non-transitory, machine-readable memory storing instructions, that when executed, cause one or more processors to perform operations comprising:
  sensing, with a location detector of a mobile computing device, locations of the mobile computing device a plurality of times over a duration of time to obtain a location history of time-stamped geolocations of the mobile computing device spanning a plurality of days;
  determining, with one or more processors of the mobile computing device, reduced resolution versions of the time-stamped geolocations in the location history, the reduced resolution versions having less resolution than sensed locations;
  determining, with a cryptographic hash function, with the one or more processors of the mobile computing device, a first set of cryptographic hash values each based on a respective time-stamp and respective location of a respective reduced resolution version of the time-stamped geolocations in the location history;
  storing in memory of the mobile computing device the first set of cryptographic hash values based on the location history of the mobile computing device;
  receiving, at the mobile computing device, from a remote server, via a wireless interface of the mobile computing device, location criteria specifying a geographic area related to a survey, the location criteria being sent from the remote server to a plurality of candidate computing devices including the mobile computing device;
  in response to receiving the location criteria, accessing, with the one or more processors of the mobile computing device, the first set of cryptographic hash values based on the location history of the mobile computing device stored in memory of the mobile computing device;
  determining, with the one or more processors of the mobile computing device, whether the location history satisfies the location criteria that specifies the geographic area related to the survey from the remote server, without decrypting the first set of cryptographic hash values based on the location history, without revealing the location history to the remote server, and without the location history being accessible via inspection of the mobile computing device, wherein:
    the location history is determined to satisfy the location criteria by determining whether any cryptographic hash values in the first set of cryptographic hash values match any cryptographic hash values in a second set of cryptographic hash values, and
    the second set of cryptographic hash values are each determined with the cryptographic hash function based on different subsets of the location criteria, the location criteria being at a same granularity as the reduced resolution versions of the time-stamped geolocations in the location history; and
  after determining that the location history satisfies the location criteria, displaying on the mobile computing device an indication that a user of the mobile computing device has an option to answer questions related to the survey, wherein:
    the location criteria comprises a plurality of locations and a time range, and
    the different subsets of the location criteria comprise permutations of the plurality of locations and times within the time range, each permutation corresponding to a different cryptographic hash value in the second set of cryptographic hash values.

26. The memory of claim 25, wherein:
determining the first set of cryptographic hash values comprises:
  for a given time-stamped geolocation in the location history:
    reducing a granularity of a location of the given time-stamped geolocation to a predetermined location granularity;
    reducing a granularity of a time of the given time-stamped geolocation to a predetermined time granularity;
    combining a resulting reduced-granularity location and reduced-granularity time into a string; and
    hashing the string with means for cryptographically hashing the string.

27. The memory of claim 25, wherein determining reduced resolution versions of the time-stamped geolocations in the location history comprises:
  selecting an identifier from a set of identifiers to reduce the granularity of a location of a given time-stamped geolocation responsive to coordinates of the location indicating a geographic area corresponding to the identifier, wherein:
    the location of the given time-stamped geolocation includes the coordinates, as measured by the location detector, and
    the set of identifiers have a predetermined granularity less than location coordinates and each identifier in the set corresponds to a given geographic area.

* * * * *